March 31, 1925.  1,531,317

C. L. STUBBS

BALL

Filed Feb. 2, 1924  2 Sheets-Sheet 1

Witness:
C. H. Wagner

Inventor
Charles L. Stubbs
By Robb, Robb & Hill
Attorneys

March 31, 1925.  C. L. STUBBS  1,531,317

BALL

Filed Feb. 2, 1924   2 Sheets-Sheet 2

INVENTOR.
C. L. Stubbs
BY
Robb Robb Hill
ATTORNEYS

Patented Mar. 31, 1925.

1,531,317

UNITED STATES PATENT OFFICE.

CHARLES L. STUBBS, OF AKRON, OHIO.

BALL.

Application filed February 2, 1924. Serial No. 690,185.

*To all whom it may concern:*

Be it known that I, CHARLES L. STUBBS, a citizen of the United States, residing at Akron, in the county of Summit and State of Ohio, have invented certain new and useful Improvements in Balls, of which the following is a specification.

The present invention relates to certain new and useful improvements in balls of that general type which are formed of some resilient or elastic material such as rubber, and has for its object to provide a ball of this character which embodies novel features of construction whereby a maximum amount of strength and resiliency is obtained.

Further objects of the invention are to provide a hollow ball which is internally reinforced and stiffened by walls and partitions so that the outer peripheral wall is reinforced and held in proper position, and which at the same time has a simple and inexpensive construction so that it can be produced without expensive machinery and at a small cost.

With the above and other objects in view, the invention resides in a peculiar internal construction of the ball as will more fully appear as the description proceeds, the novel features thereof being pointed out in the appended claims.

For a full understanding of the invention, reference is to be had to the following description and accompanying drawings, in which—

Corresponding and like parts are referred to in the following description, and indicated on all of the views of the drawing, by like reference characters.

The invention is adapted to be utilized in the manufacture of game balls or similar articles which ordinarily have a hollow or partially hollow formation and are formed of some initially plastic material such as rubber, celluloid, or the like. The balls may be of any size, and are intended to be initially formed in half sections which are subsequently fitted together in the usual manner to form a complete ball. The ball is formed with an outer peripheral wall A and a number of internal walls or webs B which sub-divide the space within the ball into a plurality of cells and serve as reinforcements for the peripheral wall A. The cells may be filled with air or gas, and the internal walls or webs B are flared or enlarged as is indicated at C where they intersect the peripheral wall A. The flared portions C of adjacent internal walls or webs B cooperate with each other to provide arched supports for the peripheral wall A, and the said peripheral wall is thus stiffened and reinforced in a most effective manner. The ball can be used for batting or like purposes and is very strong so that it will not be indented to any perceptible degree when used in the customary manner.

Figure 1:
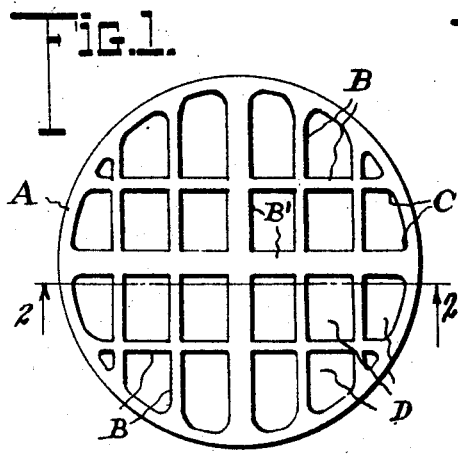
Fig. 1 is a plan view of the flat face of a hemispherical half of a ball, showing the same as it is initially produced and before it is fastened to a similar half section to produce a complete ball.
Figure 2:
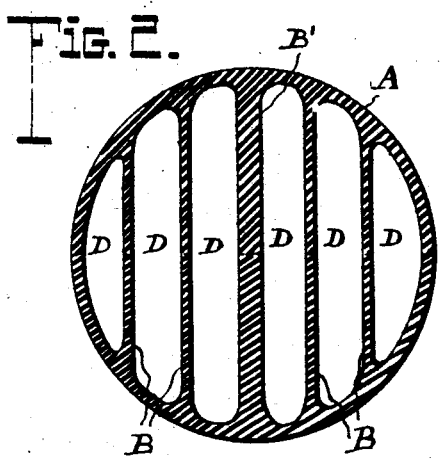
Fig. 2 is a transverse sectional view through a complete ball formed by fastening together two half sections made in the manner indicated by Fig. 1, the plane on which the section is taken being indicated by the line 2—2 of Fig. 1.

One of many possible embodiments of the invention is illustrated by Figs. 1 and 2 of the drawing. The half sections of the balls, as they are initially formed, are provided with two sets of internal walls or webs B which are arranged in planes at right angles to the flat face of the hemispherical half of the ball and intersect each other at substantially right angles. The intersecting sets of internal walls or webs B provide a plurality of cells D, which extend through the half ball section from the flat face thereof to the curved or peripheral walls or webs, and the internal walls B are enlarged or flared at their intersections with the curved outer wall A of the ball, whereby an arched support is provided for the said curved outer wall. In this particular embodiment of the invention, there are two of the intersection internal walls or webs B which are arranged on median planes of the ball and have a thickness greater than that of the other walls, the said thicker walls being identified on the drawing by the reference character B'. In order to form a complete ball, two half sections such as that shown by Fig. 1, are secured together in the usual manner to form a complete ball as indicated by Fig. 2.

Figure 3:
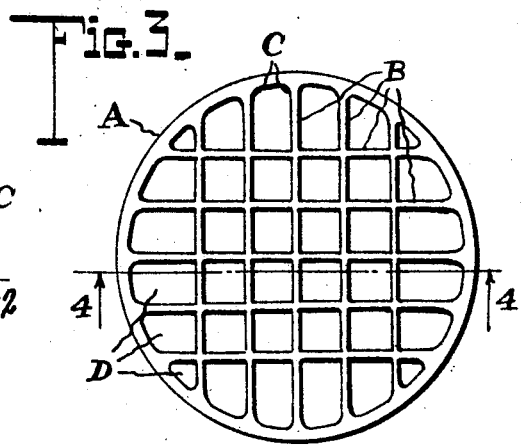
Fig. 3 is a view similar to Fig. 1, showing a slightly modified form of the invention.
Figure 4:
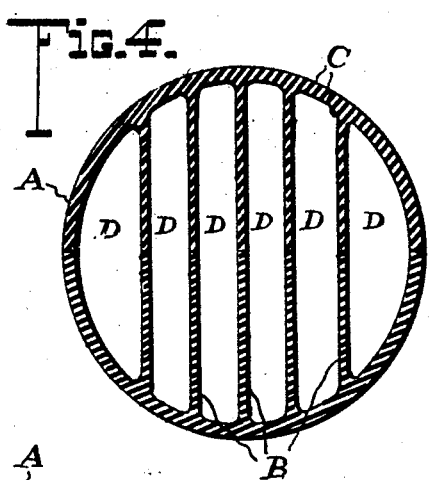
Fig. 4 is a view similar to Fig. 2, being taken on a plane indicated by the line 4—4 of Fig. 3.

Another possible embodiment of the invention is illustrated by Figs. 3 and 4 in which the internal walls B have the same general arrangement as that shown by Fig. 1, although all of the internal walls are of a uniform thickness, and an increased number of the walls which are of a less thickness than those shown by Fig. 1 are utilized. The interior of the ball is thus sub-divided into a greater number of the cells D, and while the internal walls B are thinner and of a less strength, they are arranged more closely together, with the result that the curved outer periphery of the ball is supported from the interior in a most effective manner, thereby providing a ball which will not be indented to any perceptible extent when used in the ordinary manner, and which will quickly regain its original shape as soon as any pressure thereon is relieved.

Figure 5:
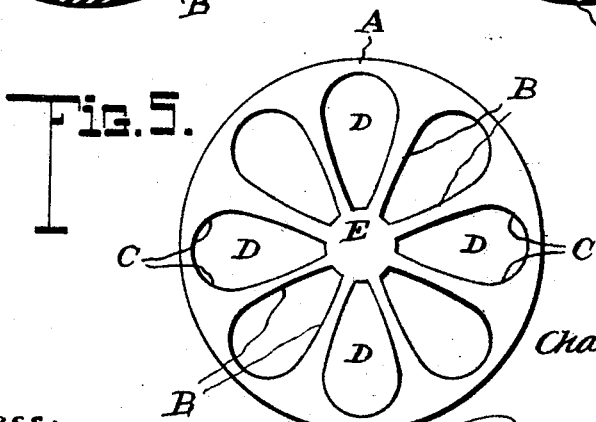
Fig. 5 is a view similar to Fig. 1, showing a further possible modification of the invention.

Another possible modification is shown by Fig. 5 in which the internal walls or partitions B are arranged in planes which radiate from a transverse axis. A core E may be provided at the axis and the outer edges of the partitions have the flared or enlarged portions C, which merge into each other and provide arched supports for the curved outer periphery of the ball.

The ball is intended to be initially formed in half sections, as previously indicated, and these half sections are subsequently fastened together to provide a complete ball. The internal walls or partitions B of the two complemental ball sections are arranged in registry with each other when the half sections are fastened together, so that the internal walls B of the two half sections cooperate with each other to provide substantially circular internal partitions which are arranged in transverse planes within the ball. These internal partitions intersect the curved outer wall A in rings, and these rings are arranged at substantially uniform intervals so that the entire outer wall A of the ball is effectively and uniformly reinforced from within.

Figure 6:
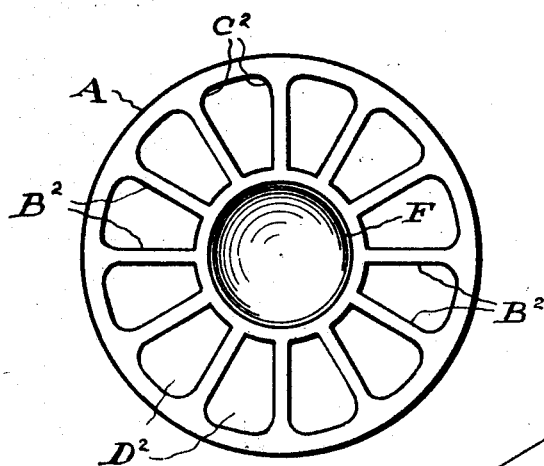
Fig. 6 is very similar to Fig. 1, showing a still further modification of the invention.
Figure 7:
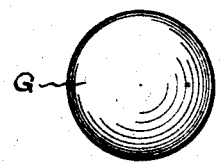
Fig. 7 is a detail view of a small spherical ball of metal or like material, which is adapted to fit in the central pocket of the modification illustrated by Fig. 6.
Figure 9:
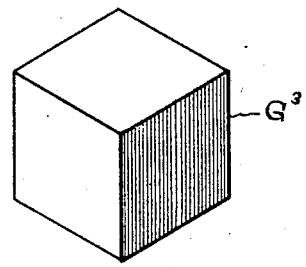
Fig. 9 is a detail view of a cube of metal or like material which is adapted to fit in the central pocket of the modification illustrated by Fig. 8.

A still further modification is illustrated by Fig. 6, in which each half section of the ball is provided at the center thereof with a semi-spherical pocket F. When the two half sections of the ball are assembled and fastened together in the usual manner, the corresponding pockets F of the sections of the ball cooperate to provide a spherical pocket at the center of the ball, and a sphere G of metal or like material may be fitted in this pocket, thereby serving to give additional weight to the ball when such is required. The walls of the pocket F are connected to the outer wall A of the ball by means of the internal walls or partitions $B^2$. These interior walls $B^2$ are shown as arranged in median planes which are at right angles with the flat face of the hemispherical half section. The cells $D^2$ which are thus provided may be filled with air or gas, and the interior walls are flared or enlarged at $C^2$ where they join the outer wall A, thereby providing arched portions which tend to stiffen and reinforce the outer wall. A ball thus formed has the same characteristics as the balls shown by Figures 1 and 3, although additional weight is imparted to the ball by the use of the center sphere G which may be of metal or other suitable substance.

Figure 8:
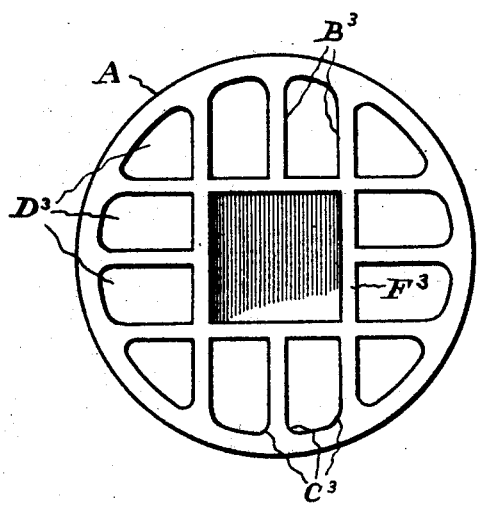
Fig. 8 is a view similar to Fig. 6 illustrating a variation in which the central pocket is rectangular instead of spherical.

The modification shown by Figure 8 is quite similar to that shown by Figure 6, although the central pocket $F^3$ is rectangular instead of spherical. The walls of this pocket are connected to the outside walls A of the ball by means of the interior walls or partitions $B^3$ which are arranged in intersecting planes at right angles to each other and also at right angles to the flat face of the semispherical half section of the ball. The partitions cooperate to provide the cells $D^3$ and the outer edges of the partitions are enlarged or flared at $C^3$ at the points where they intersect the outer wall A, thereby effectively stiffening the outer wall as has been previously explained. When the two half sections of the ball are fastened together, a rectangular pocket is provided at the center of the ball, and a rectangular block $G^3$ of metal or other suitable material may be inserted in this pocket to increase the weight of the ball.

While certain possible embodiments of the invention have been shown and described in detail for illustrative purposes, it will be understood that the invention is susceptible of various embodiments and many changes can be made in the details of construction without departing from the spirit of the invention.

Having thus described my invention, what I claim as new and desire to secure by Letters Patent, is:

1. A hollow ball including an outer curved peripheral wall, and a plurality of flat internal reinforcing webs extending across the interior of the ball.

2. A hollow ball including an outer curved peripheral wall, and a plurality of flat internal reinforcing webs extending across the interior of the ball, said flat webs being arranged in different planes which intersect each other.

3. A hollow ball including an outer curved peripheral wall, and a plurality of sets of interior partitions extending across the interior of the ball, the different sets of partitions intersecting each other to provide interior cells and the partitions being flared at their intersection with the outer wall to provide arched supports for the outer wall.

4. A hollow ball including an outer curved peripheral wall, and a plurality of flat internal reinforcing webs extending across the interior of the ball, said flat webs being arranged in intersecting planes, and selected webs being thicker than other webs.

5. A hollow ball including an outer wall and a plurality of interior partitions extending across the interior of the ball, certain of the partitions being thicker than others of the partitions and the partitions being flared at their intersections with the outer wall to stiffen and reinforce the outer wall.

6. A hollow ball including an outer wall and a plurality of sets of intersecting interior partitions extending across the interior of the ball, certain of the partitions being arranged upon median planes of the ball and being thicker than the other partitions, the intersecting partitions providing interior cells within the ball, and the partitions being flared at their intersections with the outer wall to stiffen and reinforce the same.

7. A hollow ball including an outer wall, and a plurality of sets of interior partitions extending across the interior of the ball, the two sets of partitions intersecting each other to provide cells and the partitions of each set being arranged in a substantially parallel relation, certain of the partitions which are arranged on median planes of the ball being thicker than the remaining partitions.

8. A hollow ball including an outer wall, an interior pocket, a weight within the pocket, and a series of interior partitions connecting the outer wall and the walls of the pocket.

9. A hollow ball including an outer wall, a central pocket, a weight fitting snugly within the pocket so as to be held against movement therein, and a plurality of interior partitions connecting the outer wall and the pocket.

In testimony whereof I affix my signature.

CHARLES L. STUBBS.